Patented Jan. 9, 1940

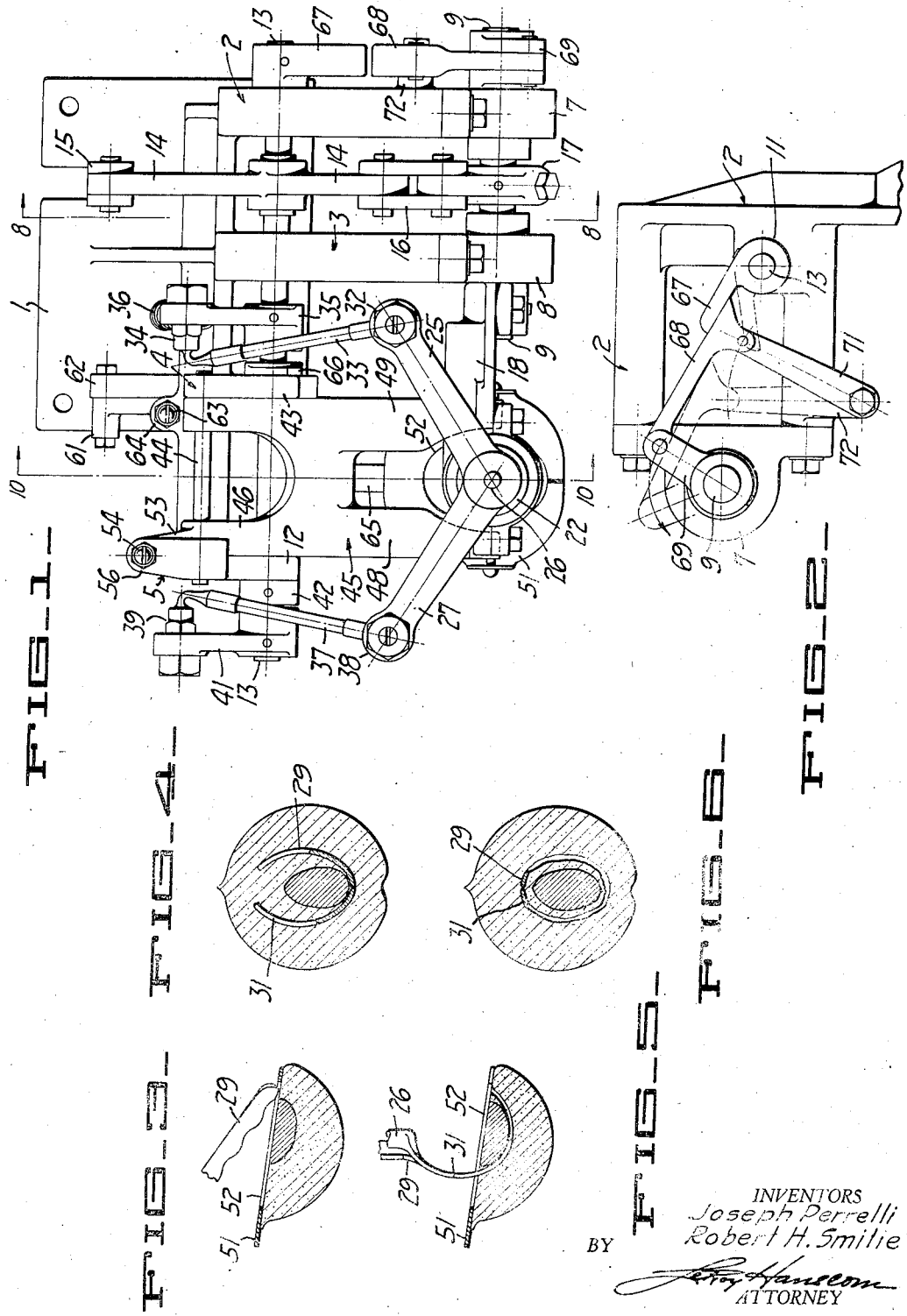

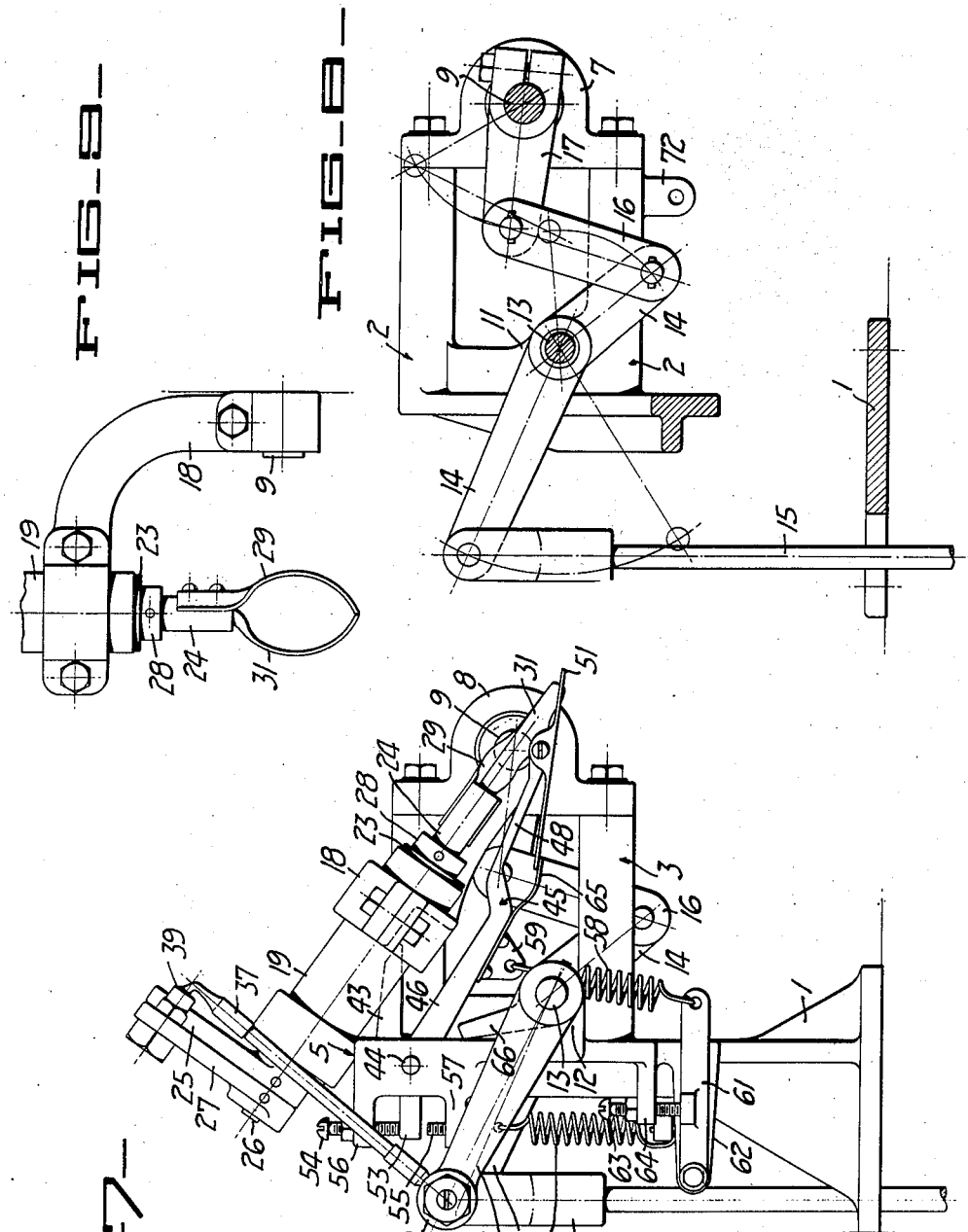

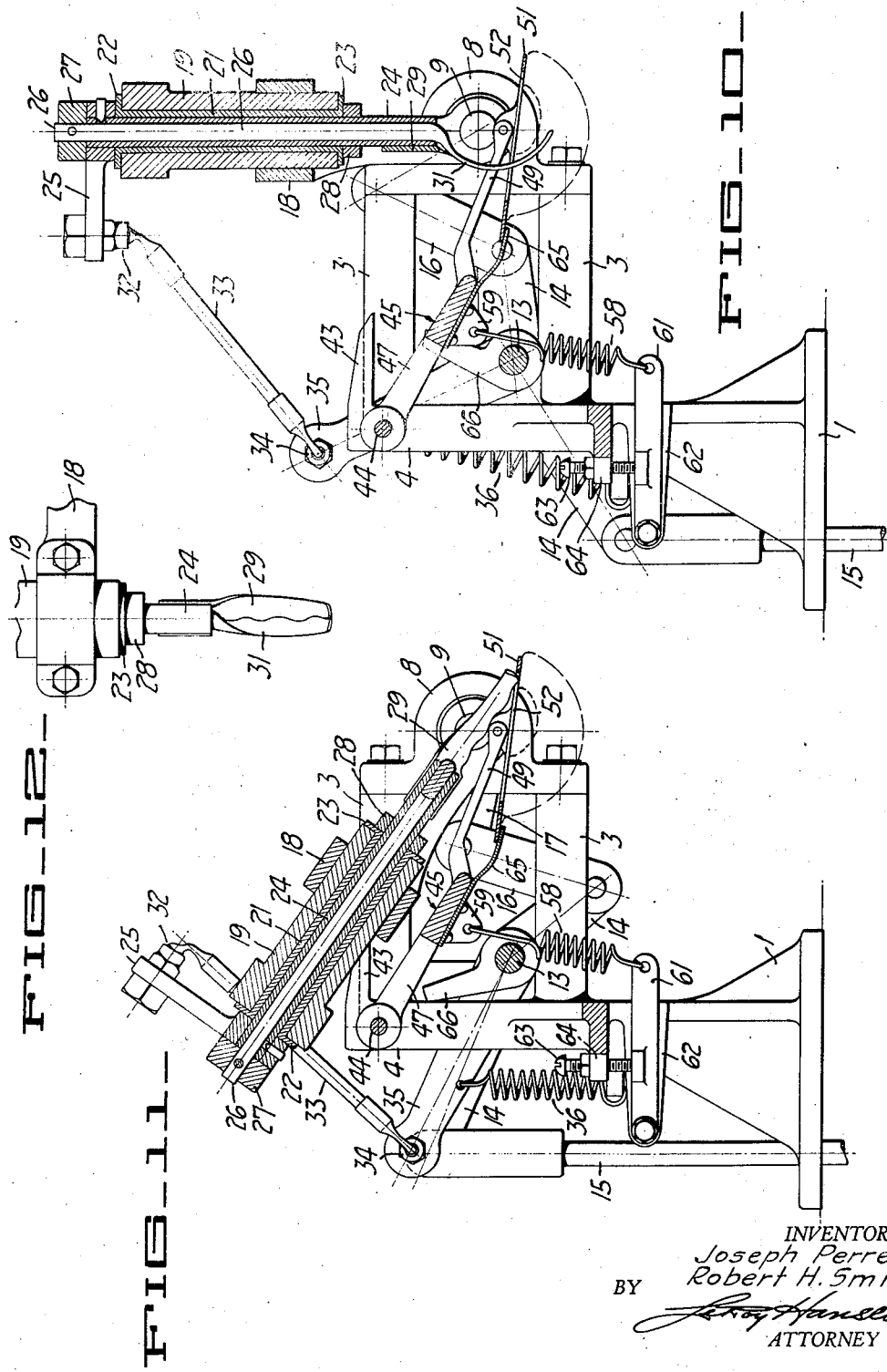

2,186,467

UNITED STATES PATENT OFFICE 2,186,467

PEACH PITTER

Joseph Perrelli, Richmond, and Robert H. Smilie, Berkeley, Calif.

Application August 31, 1935, Serial No. 38,748

7 Claims. (Cl. 146—28)

This invention particularly relates to peach pitters but it will be readily appreciated by persons skilled in the art that our invention is applicable to the pitting or coring of other fruits such as plums, apricots, apples, pears and the like.

In general the object of our invention is the provision of a pitter wherein a pair of complementary arcuate knives are arranged to rotate about a common axis to thereby generate or describe a surface of revolution substantially conforming to the outer surface of a peach pit when split along the plane of its rib or suture and wherein said knives are arranged simultaneously to rotate bodily about an axis at right angles to said common axis so that the knives not only move toward each other but also have a scooping action.

Another object of the invention is the provision in a peach pitter of means for holding a halved peach in selected adjusted positions with respect to the cutting knives of the pitter depending upon the size of the pit or stone to be extracted.

Further objects of the invention are such as may be attained by a utilization of the various combinations, sub-combinations and principles more fully hereinafter set forth and as defined by the appended claims.

Referring to the drawings:

Fig. 1 is a top plane view of a peach pitter embodying the objects of our invention and shown at the end of cycle or pitting operation.

Fig. 2 is partial right end elevation of the pitter shown in Fig. 1 but at the beginning of its cycle.

Fig. 3 is a vertical mid-section taken thru a peach and the cutting knives at the beginning of the pitting operation.

Fig. 4 is a top plane view of a peach and pitting knives at the beginning of the pitting operation.

Fig. 5 is a vertical mid-section taken thru a peach and the pitting knives at the end of the pitting operation.

Fig. 6 is a top plane view of a peach and the pitting knives at the end of the pitting operation.

Fig. 7 is a left end elevation of the peach pitter shown in Fig. 1, but at the beginning of its cycle.

Fig. 8 is a vertical section taken on the line 8—8 of Fig. 1.

Fig. 9 is a top plane view of the pitting knives and their supporting bracket at the beginning of the pitting operation.

Fig. 10 is a vertical section taken on the line 10—10 of Fig. 1 with the pitting knives shown at the end of the pitting operation.

Fig. 11 is a vertical section taken on the line 10—10 of Fig. 1 with the pitting knives shown at the beginning of the pitting operation.

Fig. 12 is a front elevation of the cutting knives shown in their closed position at the end of the pitting operation.

Our invention contemplated the use of a pedestal standard 1 provided with a pair of spaced U shaped brackets 2 and 3 at one end and with a pair of spaced brackets 4 and 5 at the other end, the standard and its four spaced brackets generally giving the appearance, when viewed from the rear, of a four tined fork. Secured to the outer or free ends of the U shaped brackets 2 and 3 are bearings 7 and 8 within which is journaled a shaft 9.

Journaled at one end, within a bearing 11 formed in the cross bar of the U shaped bracket 2, and at the other end in a bearing 12 formed in the bracket 5, is a shaft 13. Pivoted on the shaft 13 intermediate the brackets 2 and 3 is a first class lever 14 the outer end of which is pivoted to an operating rod 15 and its inner end to one end of a link 16. The other end of the link 16 is pivoted to a crank 17 which is keyed or clamped to the shaft 9 intermediate the bearings 7 and 8 of the U shaped brackets 2 and 3. It will therefore be seen that, as reviewed in Figure 8, a downward motion of the operating rod 15, which obviously can be effected manually by means of a pedal or mechanically by means of a motor, causes the shaft 9 to rotate in a clockwise direction. Keyed or clamped to the inner end of the shaft 9 (see Figs. 1 and 9) is a curved or L shaped bracket 18 to the inner end of which is clamped a tubular sleeve 19. Within the sleeve 19 is a tubular bearing member 21, held in position within the sleeve 19 by means of flanges 22 and 23 formed on either end of the bearing 21. Journaled within the bearing member 21 is a tube 24 the upper end of which is keyed or otherwise secured to a crank 25 and journaled within the tube 24 is a rod or shaft 26 whose upper end is secured to a crank 27. Longitudinal movement of the tube 24 relative to the tubular bearing member 21 is prevented by a collar 28 secured to the tube 24 immediately below the flange 23. Screwed or otherwise secured to the lower end of the tube 24 is a curved or arcuate pitting knife 29 the cutting edge of which is serrated or corrugated as best shown in Fig. 12. The lower end of the rod or shaft 26 is formed into a pitting knife 31 similar and complementary to the knife 29 and provided on its cutting edge with serrations or corrugations adapted to mesh with the corrugations of the knife 29. The pair of knives 29 and 31 form together in their open position as shown in Fig. 9, an ellipse conforming in general to the shape of a peach pit viewed at right angles to the plane of its rib or suture. Upon rotation of the knives downwardly toward each other about the common axis of the tube 24 and the shaft 26 the knives describe a surface of revolution substantially conforming to the outer surface of a pit split along its suture.

Secured to the outer end of the lever 25 by means of a ball and socket joint 32 is a link 33 the opposite end of which connects by means of a ball and socket joint 34, to the outer end of a crank 35, clamped or keyed to the shaft 13 intermediate the brackets 3 and 4. As shown in Figs. 7, 10 and 11 a spring 36 secured at one end to the crank 35 and at the other end to the standard 1 serves to urge the crank 35 downwardly. A link 37 connects the crank 27 by means of ball and socket joints 38 and 39 (Fig. 7) to the outer end of a crank 41 keyed or clamped to the shaft 13 as viewed in Fig. 1. Longitudinal movement of the shaft 13 is prevented by a collar 42 secured to the shaft by means of a set screw so that it engages the outer face of the bearing 12 formed in the bracket 5.

The bracket 18 is supported in its normal inoperative position by means of a stop 43 which forms an extension of the bracket 4 (Fig. 1).

It will therefore be seen that a downward movement of the operating rod 15 effects, thru the lever 14, link 16 and crank 17, a clockwise rotation of the shaft 9 as viewed in Figs. 7, 8, 10 and 11 and that the tubular sleeve 19 and its knife assembly is made to rotate in a clockwise direction about the axis of the shaft 9. In this connection it should be noted that the axis of the shaft 9 passes substantially thru the center of the surface of revolution generated by the pitting knives 29 and 31 as hereinafter more fully explained. Since the cranks 35 and 41 to which the links 33 and 37 are secured, are restrained from rotating upwardly by means of the spring 36, the outer ends of the cranks 25 and 27 are held against any substantial vertical movement. The clockwise rotation of the sleeve 19 in a plane at right angles to the axis of the shaft 9 (Figs. 10 and 11) therefore causes the pitting knives to rotate downwardly toward each other and imparts to the knives a bodily scooping motion about the axis of the shaft 9. The surface of revolution generated by the knives is due to two independent simultaneous and superposed motions, one, the rotation of the knives about the axis of the sleeve 19 and the other, the bodily rotation or scooping motion of the knives about the axis of the shaft 9.

Pivoted to a shaft 44 (Fig. 1) supported by the brackets 4 and 5 is a plate 45 bifurcated at both ends so as to form forks 46 and 47 at its upper end and forks 48 and 49 at its lower end. To the lower forks 48 and 49 is pivoted a peach guiding plate 51 provided with a central elliptical opening 52 somewhat larger than a peach pit or stone and thru which the pitting knives are adapted to operate. The upper fork 46 of the plate 45 is provided with an extension 53 adapted to operate between a pair of spaced stops or set screws (Fig. 7) 54 and 55 carried by arms 56 and 57 of the bracket 5. The extension 53 is normally maintained in contact with the upper stop or setscrew by means of spring 58 one end of which is secured to the bifurcated plate 45 by means of a clip 59 and the other end of which is secured to one end of a lever 61. The opposite end of the lever 61 is pivoted to a bracket 62 formed on the standard 1 and its central portion is held in engagement with a setscrew 63 carried by the bracket 64 which forms an extension of the standard 1. The pivotal movement of the plate 51 is limited by the forks 48 and 49 and by a finger 65 which forms an extension of the clip 59. As best shown in Figs. 10 and 11 a halved peach is held by an operator against the lower face of the plate 51 with its pit in registration with the elliptical opening 52 and in the path of the pitting knives. By exerting an upward pressure against the halved peach the plate 45 may be moved upwardly against the action of the spring 58 so as to permit the pitting knives to make a deeper cut into the peach according to the size of its stone. The nature of the cut may be further adjusted by rocking the peach guiding plate 51 about the ends of the forks 48 and 49.

The counter-clockwise rotation of the shaft 13 (as viewed in Figs. 7, 8, 10 and 11) is limited by means of a stop 66, keyed or otherwise secured to the shaft 13, and adapted to engage the bracket 4.

Locked to the right hand end of the shaft 13 (Figs. 1 and 2) by means of a set screw is a stop 67 adapted to slidably engage with a link 68 during the major portion of the cycle of operation of the pitter. One end of the link 68 is pivoted to a crank 69 secured to the shaft 9 by a setscrew and its other end is pivoted to one end of a link 71 the other end of which is pivoted to an extension 72 of the U shaped bracket 2. The crank 67 and the shaft 13 are locked against counter-clockwise rotation (Fig. 2) until the link 68 clears the free end of the crank 67. During this major portion of the cycle the pitting knives have rotated downwardly toward each other to a position where they mesh with each other as shown in Fig. 12. During the brief remainder of the cycle of operation the shaft 13 is free to rotate against the action of the spring 36 and in this period the engaging pitting knives are given a slight further scooping action in order to tear and cut any fibrous matter that may remain between the pitting knives. It should be particularly noted that although the positive rotation of the pitting knives about the axis of the sleeve 19, depends upon locking the shaft 13 against rotation, it is essential for the protection of the pitting knives that the shaft 13 be free (except for the action of the spring 36) to rotate at the instant that the knives contact each other. Otherwise during the final bodily scooping motion of the knives the cutting edges of the knives would be jammed against each other and thereby damaged. The action of the pitting knives may therefore be described as a rotary scooping motion about the axis of the shaft 9 during the entire pitting operation on which is superposed an independent rotary motion of the knives about the axis of the sleeve 19, terminating just short of the complete pitting operation.

We claim:

1. A peach pitter comprising a pair of complementary arcuate knives rotatably mounted on a common axis to describe a surface of revolution substantially conforming to the outer surface of a peach pit split along its suture; means for rotating said knives toward each other and additional means for simultaneously rotating said knives bodily about an axis intersecting said common axis at right angles substantially at the center of said surface of revolution.

2. A peach pitter comprising a pair of complementary arcuate knives rotatably mounted on a common axis and together defining an ellipse when in their open position; means for rotating said knives bodily about an axis intersecting said common axis at right angles at substantially the center of said ellipse and additional means for simultaneously rotating said knives toward each other so as to describe a surface of revolution substantially conforming to the outer surface of a pit split along its suture.

3. A peach pitter comprising a pair of complementary rotatably mounted curvilinear knives lying in a common plane in their normally open position and in a second plane at right angles to said common plane in their closed position; means to rotate said knives from one of said planes to the other and additional means for bodily rotating said knives about an axis lying substantially in said first mentioned common plane and intersecting the line of intersection of said first mentioned common plane with the second plane at substantially the common center of said curvilinear knives when in their open position.

4. A peach pitter comprising a frame, a shaft journaled in said frame; means for rotating said shaft; an arm secured to said shaft; a sleeve secured to said arm at right angles to said shaft with its axis substantially intersecting the axis of the shaft; a curvilinear pitting knife secured to the lower end of a tubular member journaled in said sleeve; a complementary curvilinear pitting knife secured to the lower end of a shaft journaled in said tubular member, the center of said knives being substantially in line with the axis of said first mentioned shaft; and means for rotating the tubular member and the shaft to which said knives are secured, in opposite directions and concurrently with the rotation of said first mentioned shaft.

5. A peach pitter comprising a frame; a shaft journaled in said frame; means for rotating said shaft; an arm secured to said shaft; a sleeve secured to said arm at right angles to said shaft with its axis substantially intersecting the axis of the shaft; a curvilinear pitting knife secured to the lower end of a tubular member journaled in said sleeve; a complementary curvilinear pitting knife secured to the lower end of a shaft journaled in said tubular member, the center of said knives being substantially in line with the axis of said first mentioned shaft; means for rotating the tubular member and the shaft to which said knives are secured, in opposite directions and concurrently with the rotation of said first mentioned shaft; and a peach supporting member secured to said frame adjacent said knives; said supporting member having an opening through which said knives are adapted to rotate.

6. A peach pitter comprising a frame; a shaft journaled in said frame; means for rotating said shaft; an arm secured to said shaft; a sleeve secured to said arm at right angles to said shaft with its axis substantially intersecting the axis of the shaft; a curvilinear pitting knife secured to the lower end of a tubular member journaled in said sleeve; a complementary curvilinear pitting knife secured to the lower end of a shaft journaled in said tubular member, the center of said knives being substantially in line with the axis of said first mentioned shaft; a crank secured to the upper end of said tubular member; and a crank secured to the upper end of the shaft journaled in said tubular member, the outer ends of said cranks being locked against substantial bodily movement.

7. A peach pitter comprising: a pair of arcuate knives each fixed at one of its extremities to one of a pair of shafts having a common axis passing through the center of said knives; means for rotating said shafts in opposite directions about their common axis; and means for simultaneously rotating both of said shafts about a second axis perpendicular to said common axis and passing through the center of said knives so that said knives describe a surface of revolution.

JOSEPH PERRELLI.
ROBERT H. SMILIE.